United States Patent Office 3,394,015
Patented July 23, 1968

3,394,015
PRODUCT AND PROCESS OF REACTING A PROTEINACEOUS SUBSTANCE WITH A SULFUR-CONTAINING COMPOUND TO PROVIDE A MEAT-LIKE FLAVOR
Christopher Giacino, Upper Nyack, N.Y., assignor to International Flavors & Fragrances Inc., New York, N.Y., a corporation of New York
No Drawing. Continuation-in-part of application Ser. No. 412,340, Nov. 19, 1964. This application Jan. 11, 1965, Ser. No. 424,805
26 Claims. (Cl. 99—140)

This application is a continuation-in-part of my co-pending application Ser. No. 412,340, filed on Nov. 19, 1964, now abandoned, which is a continuation-in-part of my earlier application Ser. No. 338,009, filed Jan. 16, 1964, now abandoned.

This invention relates to edible compositions and their production. The products are characterized by their meat-like flavor. They may have food and/or aroma value per se, and may be used as such or in the preparation of soups, gravy and other food products to enhance the flavor thereof.

It is an object of this invention to provide edible compositions having a meat-like flavor and aroma and to do so by simple and efficient processes.

The invention comprises the novel products as well as the novel processes and steps of processes according to which such products are manufactured, the specific embodiments of which are described hereinafter by way of example, and in accordance with which I now prefer to practice the invention.

In accordance with this invention edible compositions are prepared comprising the product of the reaction, in the absence of a mono-saccharide, of a proteinaceous substance and a sulfur-containing compound, more particularly defined below.

It has heretofore been proposed to employ monosaccharides in various edible compositions. I have found, however, that the use of such saccharide in preparing the composition of my invention is not necessary, and in fact a superior product in flavor, aroma and other characteristics is obtained by the omission of such mono-saccharide in the reaction.

Sulfur-containing compounds may be sulfur-containing amino acids, liberating hydrogen sulfide, or may be lower alkyl mercaptans, or lower alkyl sulfides, or lower alkyl disulfides or may be an inorganic sulfur compound, or hydrogen sulfide itself, each of which is adapted to liberate a meaty flavor under heating. Such inorganic sulfur compounds are designated herein as having the formula $MS_x$, where M is selected from the group consisting of an alkali metal, an alkaline earth metal and ammonium, and $S_x$ is selected from the group consisting of sulfide, and sulfhydrate.

When hydrogen sulfide or a lower alkyl mercaptan is used it is necessary to control the amounts used so as to avoid overpowering the aroma of the product with the aroma of the mercaptan or the hydrogen sulfide. The lower alkyl mercaptans and sulfides preferably contain 1 to 6 carbon atoms. The lower alkyl disulfides preferably contain 1 to 3 carbon atoms.

The products of the invention, as exemplified in the examples below, all have meaty flavors and aromas. They may have flavors and aromas resembling beef, pork, chicken or other meats.

Cysteine is mentioned especially as a preferred sulfur-containing amino acid. Especially preferred products resembling natural beef in their flavor and aroma are produced from mixtures of cysteine and their salts with protein hydrolysates.

An additional roasted flavor may be introduced into the product by the use of pyruvic acid or pyruvic aldehyde or dihydroxyacetone.

The products of the invention may be provided as dry solids, in liquid mixtures or in pastes. Preferably, they are prepared by heating aqueous mixtures of the selected components. The resulting liquid products may be used as such, or they may be concentrated for use. If solid products are desired, the same may be obtained by drying the liquid mixtures. The aqueous compositions are dehydrated by spray drying, although drum, freeze and other drying procedures are applicable. A solid carrier is often added to the liquid mixture before drying.

According to the preferred process of this invention the ingredients are taken up with water and the mixture heated.. Although the time and temperature are not critical, if refluxing is used, it is most convenient to reflux the aqueous mixture for a period of from three to five hours. Longer periods may be used at less than reflux temperature, and shorter periods may be used when the treatment is carried out under pressure at higher than reflux temperature. During reflux or heating as above the reaction product is formed.

The best properties of the compositions are often brought out by permitting the composition to age for from two to four days after the heat treatment. Aging is not essential, however.

A large weight excess of water is preferably used in preparing the aqueous liquid compositions of this invention, although such excess is not essential. Varying amounts of water, for example from about 1:1 to about 10:1 by weight, based on the total weight of the mixture, can be used. After heat treatment, and aging if desired, the water can be at least partially evaporated to provide more concentrated liquid compositions; or fully evaporated to produce solid, edible compositions.

As aforesaid, compositions resembling natural beef products in their flavor and aroma are produced from mixtures containing cysteine or cystine and a proteinaceouss substance. The most useful of these products are obtained from mixtures containing one or more of these acids together with thiamine, suitably as an acid salt, and a protein hydrolysate.

By the term "proteinaceous substance" is meant an edible protein, an edible protein hydrolysate or mixtures thereof which may contain some free amino acids together with various protein derivatives such as proteoses, peptones, polypeptides and dipeptides. Among the proteins used which may be used are albumins, globulins, gluteline, prolamines, albuminoids, histrones, protamines, nucleoproteins, glycoproteins, phosphoproteins, chromoproteins and lipoproteins. These may be used in the natural state, e.g., as meat or meat scraps or other meat protein concentrates.

Many protein hydrolysates are available which are useful for the preparation of the compositions of this invention. These include animal, fish and vegetable protein hydrolysates. The preferred hydrolysates are vegetable products such as those from yeast, corn or wheat.

The amount of proteinaceous substance used in my compositions may vary within wide limits. For example, liquid compositions may be prepared using as little as 4% by weight or as much as 40% by weight of proteinaceous substance based on the total weight of the composition. I prefer to use protein hydrolysates in my compositions to obtain the best flavors.

Thiamine may be used as a free base, but is preferably employed as an acid salt. The preferred salts are halogen acid salts and, of these, the hydrochloride is especially suitable. The amount of thiamine used in the preparation of meat flavors whether as the free base or as the acid salt generally varies from about 0.2% to about 20%, by weight, based on the total weight of the liquid composition, although useful products may be prepared with greater or lesser amounts.

Cysteine and cystine are sulfur-containing amino acids readily available as fre amino acids or as salts, both acid and basic. Preferably, the acid salts especially the halogen acid salts, such as the hydrochloride are utilized. For most purposes the desired flavor quality is achieved by the use of from about 0.2% to about 20% by weight of each of these amino acids as free acids or as salts, or a combination of them totaling the same proportion by weight based on the total weight of the liquid composition. Useful products may be obtained using somewhat greater or lesser amounts.

For pork flavored compositions, the sulfur-containing amino acid of choice is methionine which also may be used as the free acid or as an acid or basic salt. The proportion used is the same as in the production of beef flavored substances with cystine, cysteine or their salts.

The inorganic sulfur-containing compounds include sodium sulfhydrate and sodium sulfide. Instead, of sodium compounds, corresponding compounds of potassium, calcium and ammonium or substituted ammonium may be substituted. Any such compound employed should be capable of reacting to give the desired meaty note.

Organic sulfur-containing compounds useful in the practice of this invention include methyl mercaptan, ethyl mercaptan and propyl mercaptan, dimethyl sulfide, dimethyl disulfide, and methyl ethyl sulfide.

Useful products can be obtained by using somewhat greater or lesser amounts of the sulfur-containing amino acid or acids, but it should be understood that the preferred amounts of sulfur-containing amino acid in the compositions as defined above are over and above the amounts of these acids or any of them which may be present either free or combined in the proteinaceous substance.

Varying amounts of other ingredients can be employed to impart special notes to the food compositions. Phenylalanine imparts a desirable sweet tangy note and β-alanine a meat sweet note.

The compositions of this invention can be employed as liquids, i.e., dispersions or solutions, or as dried products. Drying may be accomplished by any convenient method. Spray drying is particularly effective.

I have found that carriers are useful in extending the flavor of my products when prepared and utilized as dry compositions. These carriers do not appreciably diminish the quality of the flavor, but they stabilize it and increase the shelf life of the product. Polysaccharides such as gum arabic are useful, as are mixtures of salts and suitable carbohydrates such as karaya, tragacanth or carboxymethyl cellulose and the like.

In a preferred process, an aliquot of the liquid composition is dried and the flavor solids content of the composition determined. An amount of carrier substantially equal to the calculated solids content of the liquid composition is added thereto and the mixture dried, preferably by spray drying. Alternatively, an amount of carrier substantially equal to the weight of the original dry ingredients is added to the liquid composition after reaction of the ingredients, and then dried. The preferred amounts of carrier are from about 0.5:1 to about 2:1, based on the solids content of the liquid mixture.

The following examples of edible substances illustrate the manner in which I now prefer to practice my invention. It is to be understood that this invention is not to be considered as limited thereto, except as indicated in the appended claims. In the Examples, the various ingredients are listed in parts by weight.

Example 1

The following ingredients were refluxed for four hours. The resulting mixture was then aged for three days and an aliquot withdrawn and dried. Based on the weight of the dry solid product obtained, sufficient gum arabic was added to the batch to provide a composition containing one part by weight of flavor solids and one part by weight of gum arabic. The composition was spray dried to produce a beef flavored product.

| | |
|---|---|
| L-cysteine hydrochloride | .88 |
| Carbohydrate-free vegetable protein hydrolysate | 30.94 |
| Thiamine hydrochloride | .88 |
| Water | 67.30 |

Example 2

The following ingredients with the exception of alcohol were refluxed for three hours. The mixture was cooled and the alcohol was added. The liquid product obtained thereby had an intense beef flavor:

| | |
|---|---|
| L-cysteine hydrochloride | 5.44 |
| Thiamine hydrochloride | 5.06 |
| Carbohydrate-free vegetable protein hydrolysate | 15.19 |
| Water | 50.05 |
| Palmitic acid | .35 |
| Glutamic acid | .53 |
| Potassium chloride | .44 |
| Dibasic potassium phosphate | .35 |
| Dibasic ammonium phosphate | 2.11 |
| Phosphoric acid | .30 |
| Calcium lactate | .18 |
| Alcohol | 20.00 |

Example 3

The following ingredients were refluxed for three hours. An aliquot was withdrawn and dried to obtain a dried product. Based on the weight of this dried product, sufficient gum arabic was added to the batch to provide a composition containing one part by weight of flavor solids and one part by weight of gum arabic. The mixture was spray dried to produce a product having the flavor and aroma of pork.

| | |
|---|---|
| Water | 77.83 |
| Dibasic ammonium phosphate | 1.20 |
| Monosodium glutamate | 1.00 |
| Potassium chloride | .25 |
| Phosphoric acid | .20 |
| Dibasic potassium phosphate | .20 |
| Calcium lactate | .10 |
| Lard | 3.20 |
| Ammonium bicarbonate | 1.00 |
| Methionine | .20 |
| Carbohydrate-free vegetable protein hydrolysate | 15.02 |

Example 4

The following ingredients were refluxed for two hours and spray dried to produce a product resembling chicken in flavor:

| | |
|---|---|
| Dibasic ammonium phosphate | 1.01 |
| Monosodium glutamate | .84 |
| Beta alanine | .84 |
| Glycine | .51 |
| Palmitic acid | .34 |
| Betaine | .34 |
| Ascorbic acid | .17 |
| Choline chloride | .17 |
| Dibasic potassium phosphate | .17 |
| Potassium chloride | .17 |
| Glutamic acid | .34 |
| L-cysteine hydrochloride | .26 |
| Thiamine hydrochloride | .05 |
| Water | 85.39 |
| Carbohydrate-free vegetable protein hydrolysate | 9.40 |

Example 5

The following ingredients were refluxed for five hours, aged for three days and spray dried to produce a product having a beef-like flavor:

| | |
|---|---|
| L-cysteine hydrochloride | 1.75 |
| Carbohydrate-free vegetable protein hydrolysate | 29.31 |
| Beta alanine | .50 |
| Thiamine hydrochloride | 1.75 |
| Water | 66.69 |

Example 6

The following ingredients were refluxed for four hours, aged for three days and spray dried to produce a dry solid having a beef flavor. Before spray drying 1 part of sodium chloride was added.

| | |
|---|---|
| L-cysteine hydrochloride | 1.71 |
| Carbohydrate-free vegetable protein hydrolysate | 28.63 |
| Thiamine hydrochloride | 1.71 |
| Water | 67.95 |

Example 7

The following ingredients were refluxed for four hours, aged for three days and spray dried to produce a solid product having a beef flavor. Before drying sufficient gum arabic was added to provide a composition containing 0.5 parts gum arabic and 1 part flavor solids.

| | |
|---|---|
| L-cysteine hydrochloride | 1.32 |
| Carbohydrate-free vegetable protein hydrolysate | 44.05 |
| Thiamine hydrochloride | 1.32 |
| Beta alanine | .50 |
| Water | 53.31 |

Example 8

The following ingredients were refluxed for four hours, aged three days and spray dried to produce a dried product having a beef flavor:

| | |
|---|---|
| Water | 53.74 |
| Dibasic ammonium phosphate | 1.06 |
| Thiamine hydrochloride | .63 |
| L-cysteine hydrochloride | .27 |
| Potassium chloride | .27 |
| Phosphoric acid (85%) | .21 |
| Dibasic potassium phosphate | .21 |
| Calcium lactate | .10 |
| Salt | 5.30 |
| Beef fat | 21.20 |
| Carbohydrate-free vegetable protein hydrolysate | 17.54 |

Example 9

The following ingredients were refluxed for three hours, aged for three days and spray dried using sufficient gum arabic to provide a composition containing 1 part of gum arabic and one part flavor solids. The resulting dry product had a flavor closely resembling that of natural beef.

| | |
|---|---|
| L-cysteine hydrochloride | .66 |
| Carbohydrate-free vegetable protein hydrolysate | 23.20 |
| Thiamine hydrochloride | .66 |
| Water | 78.48 |

Example 10

The following ingredients were refluxed for three hours and thereafter sufficient gum arabic added to provide a composition having one part by weight gum arabic and one part by weight flavor solids. The composition was spray dried to produce a product having a flavor resembling that of pork.

| | |
|---|---|
| Dibasic ammonium phosphate | 1.28 |
| Monosodium glutamate | 1.07 |
| Potassium chloride | .27 |
| Phosphoric acid | .22 |
| Dibasic potassium phosphate | .22 |
| Calcium lactate | .11 |
| Lard | 3.43 |
| Ammonium bicarbonate | 1.07 |
| D-L Methionine | .22 |
| Water | 83.66 |
| Carbohydrate-free vegetable protein hydrolysate | 8.55 |

Example 11

The following ingredients were refluxed for two hours and thereafter sufficient gum arabic added to provide a composition containing two parts gum arabic and one part flavor solids by weight. The composition was spray dried to produce a dry product with a flavor resembling that of chicken.

| | |
|---|---|
| Dibasic ammonium phosphate | .81 |
| Monosodium glutamate | .67 |
| Beta alanine | .67 |
| Glycine | .41 |
| Palmitic acid | .27 |
| Betaine | .27 |
| Ascorbic acid | .14 |
| Choline chloride | .14 |
| Dibasic potassium phosphate | .14 |
| Potassium chloride | .14 |
| Glutamic acid | .28 |
| L-cysteine hydrochloride | .21 |
| Thiamine hydrochloride | .05 |
| Water | 69.80 |
| Pork meat | 26.00 |

Example 12

The following ingredients were refluxed for two hours and sufficient gum arabic added to provide a composition containing one part gum arabic and one part flavor solids by weight. The composition was drum dried to produce a dry product with a flavor resembling beef.

| | |
|---|---|
| L-cysteine hydrochloride | 2.00 |
| Thiamine hydrochloride | 2.00 |
| Water | 67.00 |
| Meat protein concentrate | 29.00 |

Example 13

The following ingredients were refluxed for four hours and sufficient gum arabic added to provide a composition containing one part gum arabic and one part flavor solids by weight. The composition was spray dried to produce a product with a flavor resembling that of beef.

| | |
|---|---|
| L-cysteine hydrochloride | .88 |
| Thiamine hydrochloride | .88 |
| Water | 67.30 |
| Carbohydrate-free vegetable protein hydrolysate | 30.94 |

Example 14

The following ingredients were refluxed for four hours and sufficient gum arabic added to provide a composition containing one part gum arabic and one part flavor solids by weight. The composition was spray dried to produce a product with a flavor resembling that of chicken.

| | |
|---|---|
| L-cysteine hydrochloride | .72 |
| Thiamine hydrochloride | .88 |
| Water | 67.46 |
| Carbohydrate-free vegetable protein hydrolysate | 30.94 |

Example 15

The following ingredients were refluxed for four hours. The resulting mixture was then aged for three days and an aliquot withdrawn and dried. Based on the weight of the dry product obtained, sufficient gum arabic was added to provide a composition containing one part by weight of flavor solids and one part by weight of gum arabic. The composition was spray dried to produce a beef flavored product.

| | |
|---|---|
| L-cysteine hydrochloride | .72 |
| Carbohydrate-free vegetable protein hydrolysate | 30.94 |
| Thiamine hydrochloride | .88 |
| Water | 67.46 |

It has been found that inorganic sources of sulfur notes can be used to replace cysteine hydrochloride and similar amino acids in the above examples. Such resulting compositions are edible, and are constituted as are the compositions above. They are products of sulfur-containing inorganic material and a proteinaceous substance.

Examples of such use are as follows:

Example 16

The following ingredients were refluxed for four hours:

| | |
|---|---|
| Sodium sulfhydrate | .88 |
| Thiamine hydrochloride | .88 |
| Carbohydrate-free vegetable protein hydrolysate | 30.94 |
| Water | 67.30 |

The composition was spray dried to produce a product with a beef flavor.

Example 17

The following ingredients were refluxed for two hours:

| | |
|---|---|
| Sodium sulfhydrate | .88 |
| Thiamine hydrochloride | .88 |
| Water | 67.30 |
| Carbohydrate-free vegetable protein hydrolysate | 30.94 |

The composition was spray dried to produce a product with a beef flavor.

Example 18

The following ingredients were refluxed for two hours:

| | |
|---|---|
| Sodium sulfide | .88 |
| Thiamine hydrochloride | .88 |
| Water | 67.30 |
| Carbohydrate-free vegetable protein hydrolysate | 30.94 |

The composition was spray dried to produce a product with a beef flavor.

In order to give a cooked note to the beef or other flavors in the above examples to produce flavors which suggest cooked products, such as baked, roasted or toasted products, I have found that such notes may be produced by heating amino acids with dihydroxy acetone or pyruvic acid or pyruvic aldehyde. As examples of this I give the following:

Example 19

The following ingredients were refluxed for four hours:

| | |
|---|---|
| L-cysteine hydrochloride | .88 |
| Thiamine hydrochloride | .88 |
| Carbohydrate-free vegetable protein hydrolysate | 31.00 |
| Water | 67.00 |
| Pyruvic aldehyde | 0.50 |

The composition was spray dried to produce a product with a beef flavor with a roasted type note.

Example 20

The following ingredients were refluxed for four hours:

| | |
|---|---|
| Pyruvic acid | .24 |
| Water | 67.00 |
| Carbohydrate-free vegetable protein hydrolysate | 31.00 |
| Thiamine hydrochloride | .88 |
| L-cysteine hydrochloride | .88 |

The composition was spray dried to produce a product with a beef flavor with a roasted type note.

A typical "pan drippings" note is added to the beef flavor of the above examples by the addition of animal tallow. This note is a very desirable one. In addition, animal tallow when used directly in the refluxing procedure or in the subsequent spray drying has the ability to trap meat flavor volatiles resulting in an improved overall flavor with an increase in the total flavor intensity.

Example 21

The following ingredients were refluxed for four hours:

| | |
|---|---|
| Water | 39.24 |
| Beef tallow | 28.00 |
| Carbohydrate-free vegetable protein hydrolysate | 31.00 |
| L-cysteine hydrochloride | .88 |
| Thiamine hydrochloride | .88 |

The composition was spray dried to produce a product with a beef flavor having a "pan drippings" note.

Example 22

The following ingredients were refluxed for four hours and aged three days, and sufficient gum arabic was added to provide a composition containing one part of gum arabic to one part of flavor solids by weight. Sufficient water was added for emulsification. The emulsion was then spray dried to produce a product with a flavor resembling pork.

| | |
|---|---|
| L-cysteine hydrochloride | .80 |
| Thiamine hydrochloride | .80 |
| Carbohydrate-free vegetable protein hydrolysate | 20.00 |
| Tallow | 77.46 |
| Palmitic acid | .30 |
| Oleic acid | .44 |
| L-leucine | .10 |
| Methionine | .10 |

Instead of thiamine hydrochloride in the above examples an equivalent amount of a substituted thiazole may be used.

The composition of this invention may be used for imparting a meat-like flavor to meatless edible compositions, and may be used to enhance the flavor of meat-containing compositions. The compositions of this invention may be incorporated in soups and soup mixes, casserole dishes, canned and frozen vegetables, animal and pet foods, sauces, gravies, stews, simulated meat products, meat spreads and dips, bakery products, and replacement for beef extracts and the like. In these applications the flavor composition of this invention is usually combined with spices, condiments, monosodium glutamate, water, flour, fats, or other edible products or flavors.

Some of the applications of the compositions of this invention are illustrated by the following examples:

Example 23

A beef bouillon cake formulation was made containing the ingredients listed, in the amounts shown:

| Ingredient | Gms./unit |
|---|---|
| Salt | 1.80 |
| The spray dried flavor of Example 13 | 0.50 |
| Gelatin (180 bloom) | 0.40 |
| Mono-sodium glutamate | 0.20 |
| Brown coloring | 0.01 |
| Garlic powder | 0.04 |
| Pepper, ground | 0.01 |
| Total: | 2.96 |

A bouillon cube will weigh from 4 to 5 grams. One cube is used with 6 ounces of boiling water.

Example 24

A beef gravy was made by formulating a gravy flavor composition of the ingredients and in the amounts indicated:

| Ingredient | Gms./unit |
|---|---|
| Cornstarch | 10.50 |
| The spray dried product of Example 13 | 3.00 |
| Caramel color | .30 |
| Garlic powder | .05 |
| White pepper | .03 |
| Salt | 1.92 |
| Mono-sodium glutamate | .20 |
| | 16.00 |

To one unit of gravy flavor concentrate, 8 ounces of water were added, and the mixture was stirred thoroughly to disperse the ingredients; brought to a boil, simmered for one minute, and served. This "meatless" gravy showed excellent beef flavor.

Example 25

A soup was made by adding 22 ounces of water to the recipe given in Example 24 for the gravy.

Example 26

A shaker composition for enhancing the flavor of meats was prepared from a variety of flavors. A powdered composition to enhance a ham flavor was made of:

| Ingredients | Percent composition |
|---|---|
| Ham spices | 2.5 |
| Mono-sodium glutamate, fine grind | 2.5 |
| Salt, fine grind | 55.0 |
| The spray dried flavor of Example 13 | 40.0 |
| | 100.0 |

Example 27

A beef noodle soup was prepared by mixing together:

| Ingredients | Gms. unit |
|---|---|
| Salt | 5.00 |
| The spray dried flavor of Example 13 | 3.00 |
| Gelatin (180 bloom) | 1.00 |
| Mono-sodium glutamate | .40 |
| Caramel color | .40 |
| Garlic powder | .10 |
| White pepper, ground | .06 |
| Mixed vegetable pieces | 36.00 |
| | 45.96 |

Three cups of water were added to the above mixture; and the mix was brought to a full boil, simmered for five minutes, and was then ready to serve.

I claim:

1. A process for preparing an edible composition comprising reacting a mixture consisting essentially of protein hydrolysate and a sulfur-containing compound selected from the group consisting of a sulfur-containing amino-acid, a lower alkyl mercaptan, a lower alkyl sulfide, a lower alkyl disulfide, hydrogen sulfide and an inorganic sulfur compound, having the formula $MS_x$ where M is selected from the group consisting of alkali-metals, alkaline-earth metals and ammonium, and $S_x$ is selected from the group consisting of sulfide and sulfhydrate to provide a meat-like flavor.

2. A process as defined in claim 1, wherein the products of the reaction are concentrated, aged and combined with a material selected from the group consisting of solvents, thickeners, carriers, extenders, and flavor and aroma-imparting ingredients.

3. A process for preparing an edible composition comprising reacting a mixture comprising a protein hydrolysate, an acid salt of thiamine, and a sulfur-containing compound selected from the group consisting of a sulfur-containing amino acid, a lower alkyl mercaptan, a lower alkyl sulfide, a lower alkyl disulfide, hydrogen sulfide, and an inorganic sulfur compound having the formula $MS_x$, where M is selected from the group consisting of alkali-metals, alkaline-earth metals, and ammonium, and $S_x$ is selected from the group consisting of sulfide and sulfhydrate to provide a meat-like flavor.

4. A process as defined in claim 3, wherein the products of the reaction are concentrated, aged, and combined with an additional material selected from the group consisting of solvents, thickeners, carriers, extenders, flavor and aroma-imparting ingredients to provide a meat-like flavor.

5. A process for the production of an edible composition which comprises heating an aqueous mixture consisting essentially of a sulfur-containing amino acid and a protein hydrolysate to provide a meat-like flavor.

6. A process according to claim 5 wherein the amino acid is selected from the group consisting of cysteine, cystine and the acid and basic salts thereof.

7. A process according to claim 5 wherein the amino acid is selected from the group consisting of methionine and the acid and basic salts thereof.

8. A process for the production of a solid, edible composition which comprises reacting an acid salt of thiamine, an amino acid selected from the group consisting of cysteine, cystine and the acid and basic salts thereof and a protein hydrolysate, and adding gum arabic thereto to provide a meat-like flavor.

9. A process for the production of a solid, edible composition which comprises reacting a compound selected from the group consisting of methionine and the acid and basic salts thereof and a protein hydrolysate to provide a meat-like flavor.

10. A process for the production of a solid, edible composition which comprises reacting a compound selected from the group consisting of methionine and the acid and basic salts thereof and a protein hydrolysate, and adding gum arabic thereto to provide a meat-like flavor.

11. An edible composition comprising the product of the reaction of a mixture consisting essentially of a protein hydrolysate and a sulfur-containing compound selected from the group consisting of a sulfur-containing amino acid, a lower alkyl mercaptan, a lower-alkyl sulfide, a lower alkyl disulfide, hydrogen sulfide, and an inorganic sulfur compound having the formula $MS_x$, where M is selected from the group consisting of alkali-metals, alkaline-earth metals and ammonium, and $S_x$ is selected from the group consisting of sulfide and sulfhydrate.

12. An edible composition according to claim 11, wherein the sulfur-containing compound is a sulfur-containing amino acid.

13. An edible composition according to claim 11 wherein the sulfur-containing compound is selected from the group consisting of cysteine and the acid and basic salts thereof.

14. An edible composition according to claim 11 wherein the sulfur-containing compound is selected from the group consisting of cystine and the acid and basic salts thereof.

15. An edible composition according to claim 11 wherein the sulfur-containing compound is selected from the group consisting of methionine and the acid and basic salts thereof.

16. An edible composition according to claim 11 wherein the sulfur-containing compound is a lower alkyl mercaptan.

17. An edible composition according to claim 11 wherein the sulfur-containing compound is a lower alkyl sulfide.

18. An edible composition according to claim 11 wherein the sulfur-containing compound is a lower alkyl disulfide.

19. An edible composition according to claim 11 wherein the sulfur-containing compound is hydrogen sulfide.

20. An edible composition according to claim 11 wherein the sulfur-containing compound is sodium sulfide.

21. An edible composition according to claim 11 wherein the sulfur-containing compound is sodium sulfhydrate.

22. An edible composition comprising the product of the reaction of a protein hydrolysate, an acid salt of thiamine, and a sulfur containing compound selected from the group consisting of a sulfur-containing amino acid, a lower alkyl mercaptan, a lower alkyl sulfide, a lower alkyl disulfide, hydrogen sulfide, and an inorganic sulfur compound having the formula $MS_x$, where M is selected from the group consisting of alkali-metals, alkaline-earth metals, and ammonium, and $S_x$ is selected from the group consisting of sulfide and sulfhydrate.

23. An edible composition according to claim 11 which additionally contains a material selected from the group consisting of solvents, thickeners, carriers, extenders, and flavor and aroma-imparting ingredients.

24. An edible composition according to claim 22 which additionally contains a material selected from the group consisting of solvents, thickeners, carriers, extenders, flavor and aroma-imparting ingredients.

25. A composition according to claim 22 wherein the sulfur-containing compound is an amino acid selected from the group consisting of cysteine, cystine and the acid and basic salts of each.

26. A composition according to claim 22 wherein the sulfur-containing compound is an amino acid selected from the group consisting of cysteine, cystine and the acid and basic salts of each, and additionally contains gum arabic.

References Cited

UNITED STATES PATENTS

| | | | |
|---|---|---|---|
| 2,627,462 | 2/1953 | Petibone | 99—17 |
| 2,738,299 | 3/1956 | Frost et al. | 99—14 X |
| 2,918,376 | 12/1959 | May et al. | 99—140 |
| 2,934,435 | 4/1960 | May | 99—140 |
| 2,934,436 | 4/1960 | May et al. | 99—140 |
| 2,934,437 | 4/1960 | Morton et al. | 99—140 |
| 3,214,276 | 10/1965 | Sakakibara et al. | 99—140 |

A. LOUIS MONACELL, *Primary Examiner.*

H. H. KLARE, *Assistant Examiner.*